(12) United States Patent
Bulat

(10) Patent No.: US 10,167,884 B2
(45) Date of Patent: Jan. 1, 2019

(54) HOOK AND LOOP STRAP WITH A HIGH POWERED MAGNET

(71) Applicant: MagStrapz, Inc., Mokena, IL (US)

(72) Inventor: Daniel Bulat, Tinley Park, IL (US)

(73) Assignee: Magstrapz, Inc., Mokena, IL (US)

( * ) Notice: Subject to any disclaimer, the term of this patent is extended or adjusted under 35 U.S.C. 154(b) by 50 days.

(21) Appl. No.: 15/456,444

(22) Filed: Mar. 10, 2017

(65) Prior Publication Data

US 2018/0031014 A1 Feb. 1, 2018

Related U.S. Application Data

(60) Provisional application No. 62/413,031, filed on Oct. 26, 2016, provisional application No. 62/307,447, filed on Mar. 12, 2016.

(51) Int. Cl.

| | |
|---|---|
| *F16B 2/08* | (2006.01) |
| *F16M 13/02* | (2006.01) |
| *A45F 5/00* | (2006.01) |
| *F16B 2/00* | (2006.01) |
| *F16B 1/00* | (2006.01) |

(52) U.S. Cl.
CPC ............. *F16B 2/08* (2013.01); *A45F 5/00* (2013.01); *F16M 13/022* (2013.01); *F16B 2/005* (2013.01); *F16B 2001/0028* (2013.01); *F16B 2001/0035* (2013.01)

(58) Field of Classification Search
USPC .................. 248/205.2, 206.5, 309.4, 683
See application file for complete search history.

(56) References Cited

U.S. PATENT DOCUMENTS

| | | | | |
|---|---|---|---|---|
| 4,826,059 A | * | 5/1989 | Bosch | A45C 11/24 206/350 |
| 7,021,594 B2 | * | 4/2006 | Exler | A47G 23/0225 248/205.2 |
| 8,181,372 B2 | * | 5/2012 | Osiecki | B60R 13/005 40/591 |
| 8,333,352 B2 | * | 12/2012 | Chambers | A61J 9/0623 248/102 |
| 9,763,510 B1 | * | 9/2017 | Miner | A45F 5/02 |
| 9,821,400 B2 | * | 11/2017 | Hillen | B23K 9/1336 |
| 2003/0231454 A1 | * | 12/2003 | Hee | A43B 3/163 361/223 |
| 2005/0034219 A1 | * | 2/2005 | Lowry | A41D 1/06 2/227 |
| 2006/0138290 A1 | * | 6/2006 | Vitito | B60R 11/02 248/205.2 |
| 2010/0064544 A1 | * | 3/2010 | Luong | A47L 23/205 34/239 |
| 2015/0232158 A1 | * | 8/2015 | Bouse | B63B 35/85 220/200 |

OTHER PUBLICATIONS

Instagram Photograph dated Feb. 16, 2017.

* cited by examiner

*Primary Examiner* — Alfred J Wujciak
(74) *Attorney, Agent, or Firm* — McDonell Boehnen Hulbert & Berghoff LLP

(57) ABSTRACT

An apparatus for removeably attaching an object to a metal surface is provided. The apparatus comprises a loop portion with a top surface and a bottom surface, a hook portion with a top surface and a bottom surface, a connector, and at least one magnet.

16 Claims, 4 Drawing Sheets

HOOK AND LOOP STRAP WITH A HIGH POWERED MAGNET

CROSS-REFERENCE TO RELATED APPLICATIONS

This application claims priority to U.S. Provisional Application No. 62/413,031, filed Oct. 26, 2016 and U.S. Provisional Application No. 62/307,447, filed Mar. 12, 2016, all of which are hereby incorporated by reference in their entireties.

FIELD

The present disclosure relates generally to apparatuses for us in industries that would benefit from having the ability to attach an object to a metal surface, such the car/truck wrapping and repair industries and the fitness industry. For example, the strap apparatus could be used in the car/truck wrapping industry for persons who use tools such as heat guns and squeegees on a regular basis. The strap may also be used in the fitness industry to attach water bottles to fitness equipment. Other industries in which the strap may be used include manufacturing, hardware, and tool industries.

BACKGROUND

In the graphic and car wrapping industry there exists the problem of what to do with tools and other needed objects during the wrapping process. Examples of such tools and objects include hot heat guns, squeegees, propane torches, beverage cans, extension cords, bottles of car wax, and manufacturing equipment for work stations. Such tools and objects need to be readily available during the wrapping process. The lack of a solution as to where to put the heat gun during the wrapping process has resulted in damage to vehicles and destruction of expensive heat guns. For example, heat guns set on roofs of cars have fallen off and broke or hit the installer resulting in a burn. In other situations, the heat gun is set on the ground and the installer has to continually bend over every minute or so. The heat guns have also been run over by a vehicle being moved. Similarly, squeegees used for the wrapping process have been dropped and lost.

In the fitness industry, exercisers need easy access to heavy water bottles. Often, machines do not have holders for water bottles.

What are needed are apparatuses for safely and easily attaching heavy objects to metal surfaces.

SUMMARY

The features, functions, and advantages can be achieved independently in various embodiments of the present disclosure or may be combined in yet other embodiments in which further details can be seen with reference to the following description and drawings.

In one example, an apparatus for removeably attaching an object to a metal surface is described. The apparatus comprises a loop portion with a looped top surface and a first smooth bottom surface; a hook portion with a hooked top surface and a second smooth bottom surface; a connector; and at least one magnet.

In one example, an apparatus for removeably attaching an object to a metal surface is described. The apparatus comprises a hook portion with a hooked top surface; a first magnet; a second magnet; and a loop portion with a bottom surface.

In one example, an apparatus for removeably attaching an object to a metal surface is described. The apparatus comprises a loop portion with a looped top surface and a first smooth bottom surface; a hook portion with a hooked top surface and a second smooth bottom surface; a connector; a first magnet; and a second magnet.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

This disclosure seeks to provide a solution to the problem of what to do with objects that need to be attached to metal surfaces, such as heat guns and squeegees during the car wrapping process. The disclosure sets forth a strap with a magnet to keep the heat gun out of the way and in a safe, secure, and convenient place for continuous use. The disclosed strap that is designed to hold a heat gun or any other object that has to be attached to metal. The strap is a self-engaging fastener system with a hook and loop. The strap is completely adjustable to accommodate any size object.

Within examples, an apparatus for removeably attaching an object to a metal surface is described. For example, when using the disclosed apparatus, a heat gun can be set on the roof of a car/truck without sliding off, thus preventing the hot heat gun from burning someone and preventing destruction of the expensive heat gun. Use of the strap to attach the heat gun to the side of a car/truck also eliminates the need for the user to continuously bend over and pick it up off the ground. This strap would also eliminate the risk of the heat gun being run over by vehicles moving around shops.

Similarly, when using the disclosed apparatus, a squeegee can be set on the roof of a car/truck without sliding off, thus preventing the squeegees from falling or being misplaced. Use of the strap to attach the squeegee to the side of a car/truck also eliminates the need for the user to continuously bend over and pick it up off the ground. This strap would also eliminate the risk of the squeegee being run over by vehicles moving around shops.

Figure 1A:
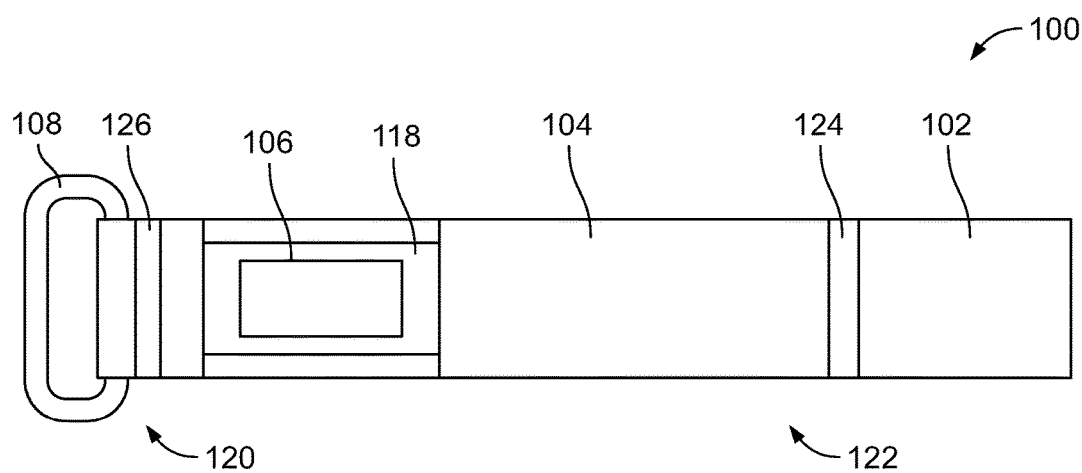
FIG. 1A illustrates a top view of an apparatus for removeably attaching an object to a metal surface, according to an example embodiment.
Figure 1B:
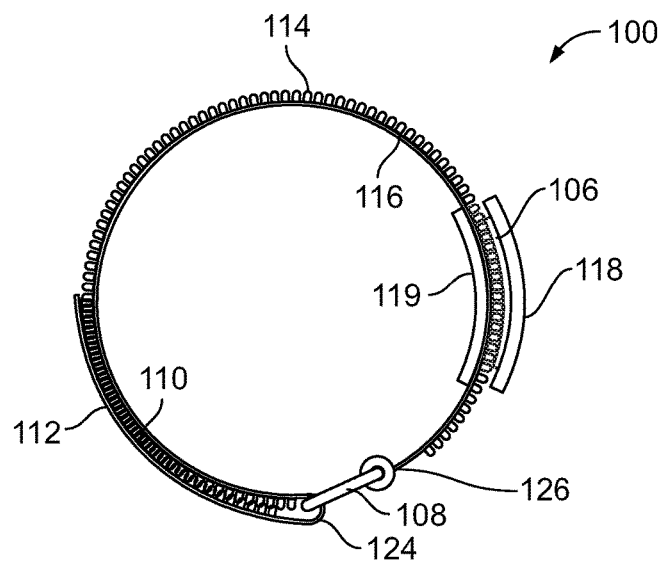
FIG. 1B illustrates a side view of an apparatus for removeably attaching an object to a metal surface, according to an example embodiment.
Figure 1C:
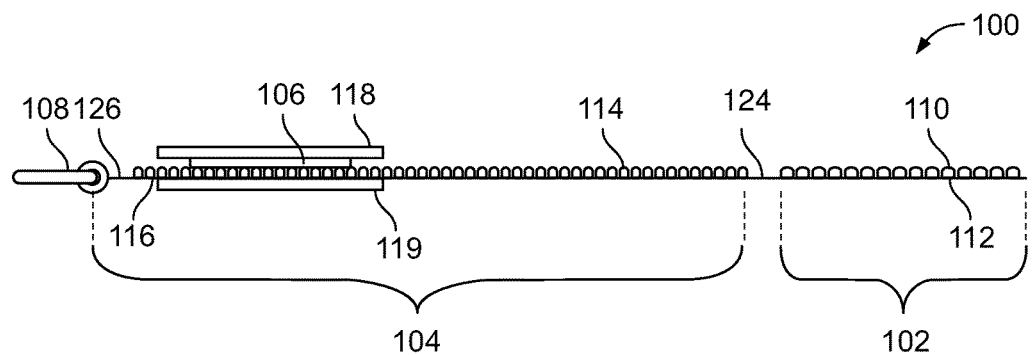
FIG. 1C illustrates a side view of an apparatus for removeably attaching an object to a metal surface, according to an example embodiment.

Referring now to FIGS. 1A, 1B, and 1C, an example apparatus 100 is illustrated. The apparatus 100 comprises a loop portion 102, a hook portion 104, at least one magnet 106, and a connector 108. The loop portion 102 includes a looped top surface 110 and a first smooth bottom surface 112. The hook portion 104 includes a hooked top surface 114 and a second smooth bottom surface 116. In other embodiments, the loop portion 102 and the hook portion 104 may be reversed (i.e., element 102 may comprise a hooked top surface and element 104 may comprise a looped top surface). For example, the smooth bottom surfaces 112 and 116 may comprise silicon or rubber, such as propane based rubber or silicon based rubber. The apparatus 100 may include a top rubber portion 118 attached to the hooked top surface 114 and a bottom rubber portion 119 attached to the second smooth bottom surface 116. The rubber portions 118 and 119 prevent the apparatus from marring the surface it is attached to and from marring the surface of the item it is holding. In an example embodiment, the rubber portions 118 and 119 may comprise non-latex gooch rubber, which is made of synthetic poly isoprene. In other embodiments, the rubber portions 118 and 119 may comprise petroleum based rubber or silicon based rubber. The at least one magnet 106 may be located between the top rubber portion 118 and the bottom rubber portion 119. In use, the top rubber portion 118 may be in contact with the metal surface and the bottom rubber portion 119 may be in contact with the item to be held.

Figure 1D:
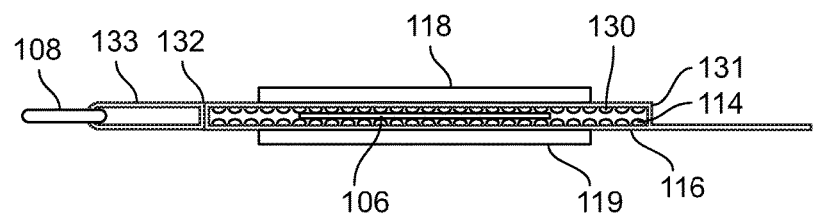
FIG. 1D illustrates an excerpt of a side view of an apparatus for removeably attaching an object to a metal surface, according to an example embodiment.

In some embodiments, the magnet 106 may be positioned on the hooked top surface 114 and an additional surface 130 may be provided in between the magnet 106 and the top rubber portion 118. The magnet 106 may be sealed between the surface 130 and the hooked top surface 114, as shown in FIG. 1D. The surfaces 130 and 114 may be joined together at points 131 and 132 by sewing, welding, gluing, or any other manner known in the art. The surfaces 130 and 114 may form a loop 133 configured to attach the connector 108. The magnet 106 may further be sealed by a hook and loop fastener system between surface 130 and 114. For example, surface 130 may be a looped bottom surface, such that it engages with hooked top surface 114. Further stitching, welding, gluing, or other methods of connection may be added around the magnet 106 to more securely seal it within the apparatus 100.

The rubber portions 118 and 119 may about 2"×3" and may be slightly larger than the magnet. In other embodiments, the rubber portions 118 and 119 may be custom sized per customer specifications. The rubber portions 118 and 119 may be similar or different sizes from each other.

The loop portion 104 may comprise a first end 120 and a second end 122. The connector 108 may be attached at the first end 120. The hook portion 102 may be attached at the second end 122. The magnet 106 may be positioned closer to the first end 120 than the second end 122. In other embodiment, the magnet 106 may be positioned approximately equidistant from the first end 120 and the second end 122. In other embodiment, the magnet 106 may be positioned closer to the second end 122 than the first end 122.

The magnet 106 may be a neodymium block magnet, such as an N42 1"×2" 3/16" magnet, which is made of grade N42 neodymium, iron, and boron magnetic alloy blend. The magnet may have a holding power of at least about 10 pounds, preferably at least about 15 pounds, and more preferably at least about 18 pounds. In other embodiments, the magnet 106 may be made of other magnetic materials known in the art, such as ferromagnetic materials.

In other embodiments, the apparatus 100 may include more than one magnet. The additional magnet(s) may be of the same type and/or size as the magnet 106. In other embodiments, the additional magnet(s) may be of different type and/or size from magnet 106.

The connector 108 may be a buckle. In some embodiments, the connector 108 may be an acetyl buckle. In other embodiments, the connector 108 may be a snap or a button or other fasteners known in the art.

The apparatus 100 may further comprise a first weld 124 configured for attaching the loop portion 102 to the hook portion 104. Welding together the loop portion 102 and the hook portion 104 allows the loop portion 102 to be able to slide through a connector, such as a buckle, for adjustability. The first weld 124 may comprise a flexible material. The apparatus 100 may also comprise a second weld 126 configured for attaching the hook portion 104 to the connector 108. The second weld 126 may be heat bonded to create a pocket for the connector 108 to be attached to the hook portion 104.

The apparatus 100 may be a 2"×14" hook and loop strap, such that the loop portion 102 and the hook portion 104 are able to engage with each other. In other embodiments, the apparatus may be a different size, such as 2"×12" or 2"×16". The apparatus 100 may also be manufactured in a custom size to fit an object.

Figure 2A:
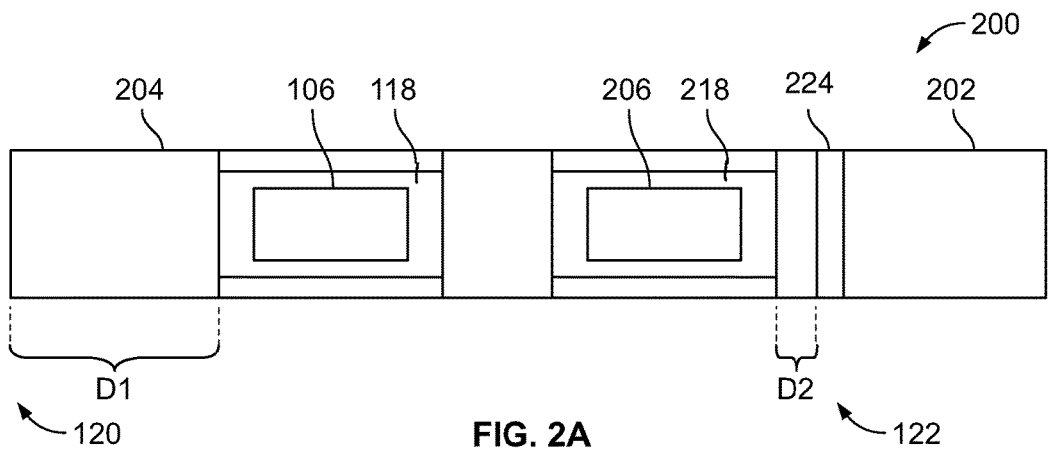
FIG. 2A illustrates a top view of an apparatus for removeably attaching an object to a metal surface, according to an example embodiment.
Figure 2B:
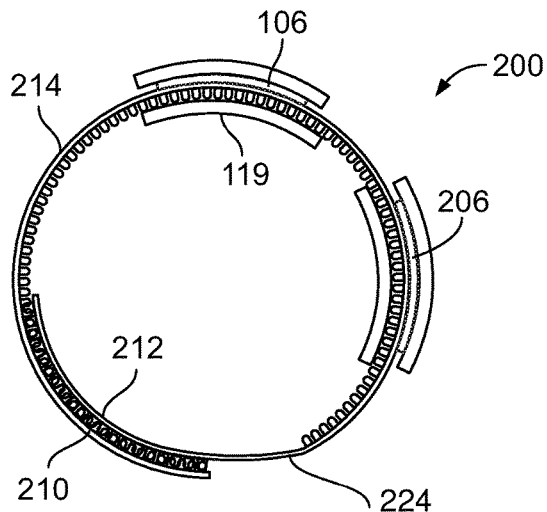
FIG. 2B illustrates a side view of an apparatus for removeably attaching an object to a metal surface, according to an example embodiment.
Figure 2C:
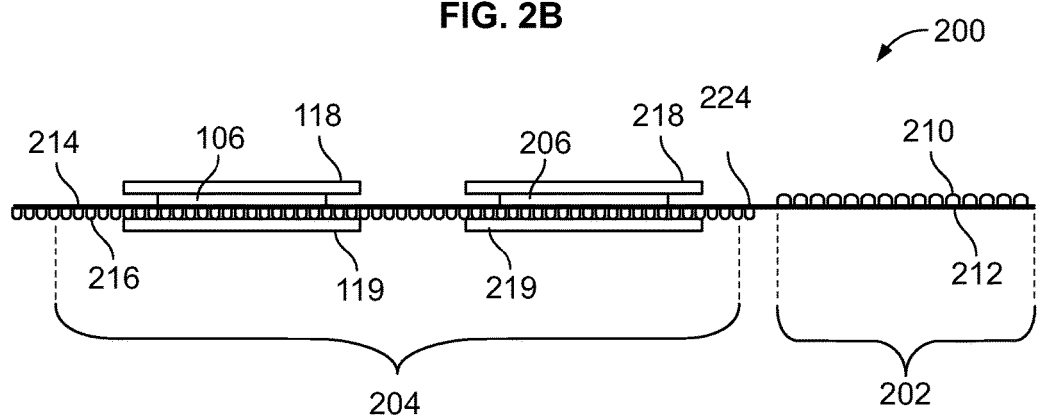
FIG. 2C illustrates a side view of an apparatus for removeably attaching an object to a metal surface, according to an example embodiment.

Referring now to FIGS. 2A, 2B, and 2C, an example apparatus 200 is illustrated. The apparatus 200 comprises a hook portion 202, a loop portion 204, a first magnet 106, and a second magnet 206. The hook portion 202 includes a hooked top surface 210 and a bottom surface 212. The loop portion 104 includes a looped bottom surface 216 and a top surface 214. The apparatus 100 may include a first top rubber portion 118, a first bottom rubber portion 119, a second top rubber portion 218, and a second bottom rubber portion 219. The first top rubber portion 118 and the second top rubber portion 119 may be attached to the top surface 214. The first bottom rubber portion 118 and the second bottom rubber portion 119 may be attached to the top surface 214. The rubber portions 118, 119, 218, and 219 prevent the apparatus from marring the surface it is attached to or in contact with. In an example embodiment, the rubber portions 118, 119, 218, and 219 may comprise non-latex gooch rubber, which is made of synthetic poly isoprene. In other embodiments, the rubber portions 118, 119, 218, and 219 may comprise petroleum based rubber or silicon based rubber. The first magnet 106 may be located between the first top rubber portion 118 and the first bottom rubber portion 119 The second magnet 206 may be located between the second top rubber portion 218 and the second bottom rubber portion 219

The first magnet 106 may be located at a first distance D1 from a first end 120, and the second magnet 206 may be located at a second distance D2 from a second end 122. In one embodiment, distances D1 and D2 are substantially the same. In another embodiment, distances D1 and D2 are different.

The rubber portions 118, 119, 218, and 219 may about 1"×2" and may be slightly larger than the magnet. In other embodiments, the rubber portions 118, 119, 218, and 219 may be custom sized per customer specifications. The rubber portions 118, 119, 218, and 219 may be similar or different sizes from each other.

The magnets 106 and 206 may be a neodymium block magnet, such as an N45 1.5"×0.25" 1/16" magnet, which is made of grade N45 neodymium. The magnet may have a holding power of at least about 10 pounds, preferably at least about 15 pounds, and more preferably at least about 18 pounds. In other embodiments, the magnets 106 and 206 may be made of other magnetic materials known in the art, such as ferromagnetic materials.

The first magnet 106 and the second magnet 206 may be the same type and/or size. In other embodiments, first magnet 106 and the second magnet 206 may be of different types.

The apparatus 100 may further comprise a first weld 224 configured for attaching the hook portion 202 to the loop portion 204. The first weld 224 may comprise a flexible material.

The apparatus 200 may be a 1" by 10.75" hook and loop strap. In other embodiments, the apparatus may be a different size, such as 1"×8" or 2"×12". The apparatus 200 may also be manufactured in a custom size to fit an object. For example, the apparatus could be designed to hold a squeegees or any small, lightweight object that has to be attached to metal. The apparatus may comprise a self-engaging fastener system with a hook and loop. The strap may be adjustable to accommodate any object less than 4 inches.

Figure 3A:
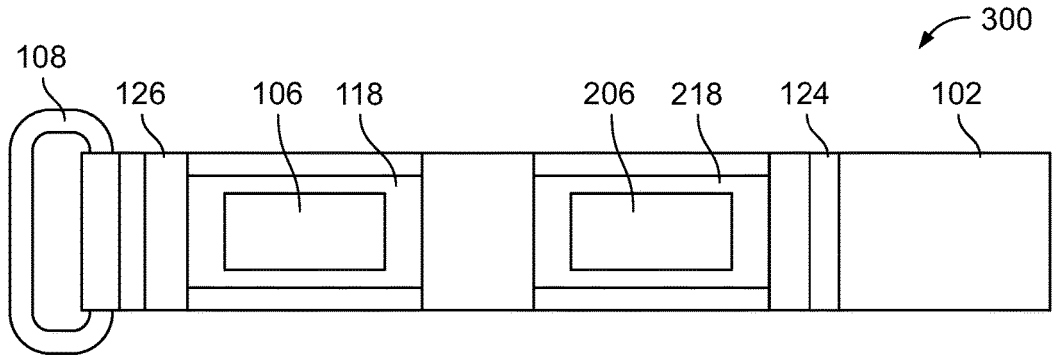
FIG. 3A illustrates a top view of an apparatus for removeably attaching an object to a metal surface, according to an example embodiment.
Figure 3B:
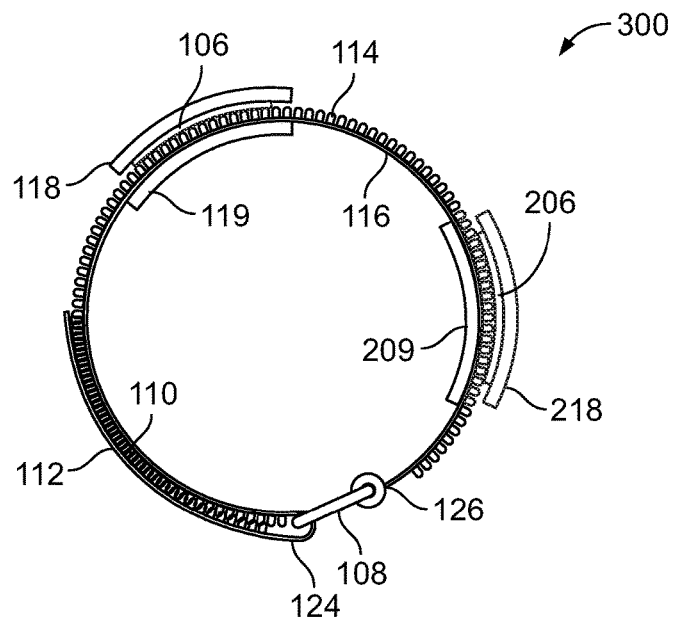
FIG. 3B illustrates a side view of an apparatus for removeably attaching an object to a metal surface, according to an example embodiment.
Figure 3C:
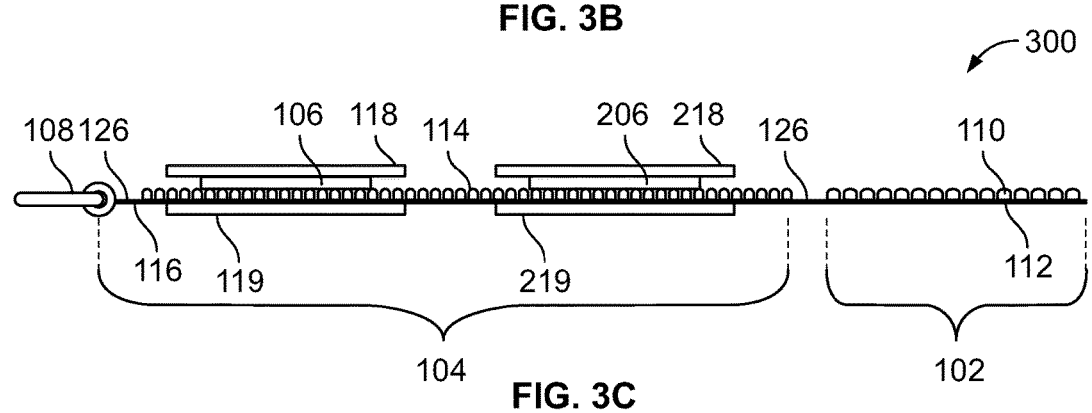
FIG. 3C illustrates a side view of an apparatus for removeably attaching an object to a metal surface, according to an example embodiment.

Referring now to FIGS. 3A, 3B, and 3C, an example apparatus 300 is illustrated. Apparatus 300 is similar to apparatus 100, with the addition of a second magnet 206, a second top rubber portion 218, and a second bottom rubber portion 219. The first magnet 106 and the second magnet 206 are arranged on the hooked surface 114 of the hook portion 104. The first top rubber portion 118 and the second top rubber portion 218 are attached to the hooked surface 114 of the loop portion and a first bottom rubber portion and a second bottom rubber portion are attached to the bottom surface 116 of the hook portion 104. The first magnet 106 is located between the first top rubber portion 118 and the first bottom rubber portion 119 and the second magnet 206 is located between the second top rubber portion 218 and the second bottom rubber portion 219.

Figure 4:
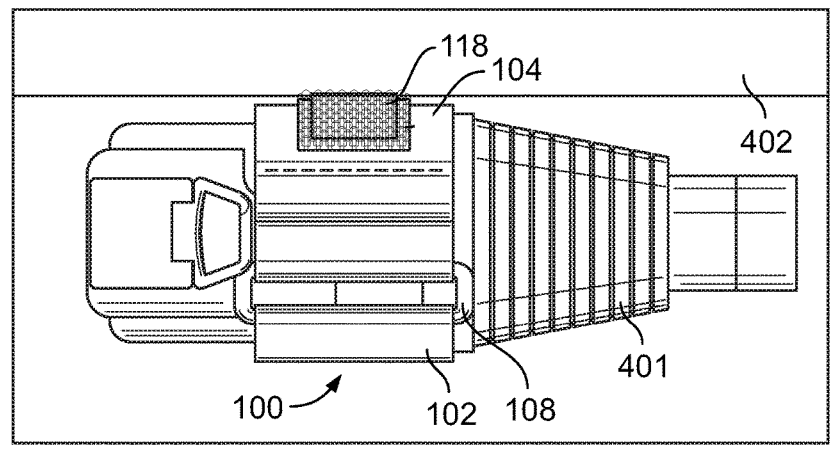
FIG. 4 illustrates a top view of an apparatus for removeably attaching an object to a metal surface, according to an example embodiment.

FIG. 4 illustrates apparatus 100 in use for attaching a heat gun 401 to a metal surface 402. Magnet 106 (not visible) is provided between the top rubber portion 118 and the hook portion 104 to removeably attach the heat gun to the metal surface 402.

By using the term "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

The invention claimed is:

1. A magnetic strap for removeably attaching an object to a metal surface, comprising:
    a loop portion with a looped top surface and a first smooth bottom surface;
    a hook portion with a hooked top surface and a second smooth bottom surface;
    a connector;
    at least one magnet;
    a top rubber portion;
    a bottom rubber portion, wherein the at least one magnet is located between the top rubber portion and the bottom rubber portion; and
    an additional surface covering the at least one magnet, wherein the top rubber portion is attached to the additional surface, and wherein the bottom rubber portion is attached to the second smooth bottom surface of the hook portion, and wherein the additional surface comprises a looped bottom surface for engaging the hooked top surface.

2. The magnetic strap of claim 1, wherein the hook portion comprises a first end and a second end, wherein the connector is attached at the first end, and wherein the loop portion is attached at the second end.

3. The magnetic strap of claim 2, wherein the magnet is positioned closer to the first end than the second end.

4. The magnetic strap of claim 1, further comprising a second magnet.

5. The magnetic strap of claim 1, wherein the connector is a buckle.

6. The magnetic strap of claim 1, wherein the magnet is positioned between a looped bottom surface and the hooked top surface of the hooked portion.

7. The magnetic strap of claim 1, further comprising a first weld configured for attaching the hook portion to the loop portion.

8. The magnetic strap of claim 7, wherein the first weld comprises a flexible material.

9. The magnetic strap of claim 1, further comprising a second weld configured for attaching the hook portion to the connector.

10. The magnetic strap of claim 1, further comprising a weld configured for attaching the hook portion to the loop portion.

11. The magnetic strap of claim 10, wherein the weld comprises a flexible material.

12. The magnetic strap of claim 1, wherein the additional surface is joined with the hook portion.

13. A magnetic strap for removeably attaching an object to a metal surface, comprising:
- a loop portion with a looped top surface and a first smooth bottom surface;
- a hook portion with a hooked top surface and a second smooth bottom surface;
- a connector;
- a first magnet;
- a second magnet;
- a first top rubber portion, a second top rubber portion, a first bottom rubber portion, and a second bottom rubber portion, wherein the first magnet is located between the first top rubber portion and the first bottom rubber portion, and wherein the second magnet is located between the second top rubber portion and the second bottom rubber portion; and
- an additional surface covering the first magnet and the second magnet, wherein the first top rubber portion and the second top rubber portion are attached to the additional surface, and wherein the first bottom rubber portion and second bottom rubber portion are attached to the second smooth bottom surface of the hook portion, and wherein the additional surface comprises a looped bottom surface for engaging the hooked top surface.

14. The magnetic strap of claim 13, wherein the first magnet is located at a first distance D1 from a first end, and wherein the second magnet is located at a second distance D2 from a second end.

15. The magnetic strap of claim 14, wherein the distance D1 and the distance D2 are substantially the same.

16. The magnetic strap of claim 13, wherein the connector is a buckle.

\* \* \* \* \*